(12) United States Patent
Collins et al.

(10) Patent No.: US 11,105,167 B2
(45) Date of Patent: Aug. 31, 2021

(54) METHOD AND APPARATUS FOR GENERATING FLUID PRESSURE PULSES OF ADJUSTABLE AMPLITUDE

(71) Applicant: Carpenter Technology Corporation, Philadelphia, PA (US)

(72) Inventors: Anthony Louis Collins, Houston, TX (US); Everett Philip Hagar, Devon (CA); Robert William McCullough, Spruce Grove (CA); Christopher Adam Well, Spring, TX (US); Thomas Clifford Williams, Houston, TX (US)

(73) Assignee: NTS Amega West USA, Inc., Houston, TX (US)

( * ) Notice: Subject to any disclaimer, the term of this patent is extended or adjusted under 35 U.S.C. 154(b) by 0 days.

(21) Appl. No.: 16/660,349

(22) Filed: Oct. 22, 2019

(65) Prior Publication Data

US 2020/0332602 A1    Oct. 22, 2020

Related U.S. Application Data

(60) Provisional application No. 62/834,648, filed on Apr. 16, 2019.

(51) Int. Cl.
| | |
|---|---|
| *E21B 28/00* | (2006.01) |
| *E21B 34/06* | (2006.01) |
| *E21B 21/10* | (2006.01) |
| *E21B 7/24* | (2006.01) |
| *E21B 31/00* | (2006.01) |

(Continued)

(52) U.S. Cl.
CPC ............ *E21B 28/00* (2013.01); *E21B 7/24* (2013.01); *E21B 10/61* (2013.01); *E21B 21/10* (2013.01); *E21B 31/005* (2013.01); *E21B 34/06* (2013.01); *F16K 31/041* (2013.01)

(58) Field of Classification Search
CPC .......... E21B 28/00; E21B 10/61; E21B 34/06; E21B 7/24; E21B 34/14; E21B 21/10; E21B 31/005; F16K 31/041
See application file for complete search history.

(56) References Cited

U.S. PATENT DOCUMENTS

| | | | |
|---|---|---|---|
| 6,279,670 B1 | 8/2001 | Eddison et al. | |
| 8,181,719 B2 * | 5/2012 | Bunney | E21B 7/24 175/56 |
| 9,238,965 B2 * | 1/2016 | Burgess | E21B 47/24 |

(Continued)

*Primary Examiner* — Nicole Coy
(74) *Attorney, Agent, or Firm* — The Webb Law Firm

(57) ABSTRACT

A pressure generating device for use in downhole drilling operations includes a rotating valve portion having a first body with at least one first flow channel, and a stationary valve portion having a second body with at least one second flow channels and at least one bypass channel. A flow restrictor is positioned within the at least one bypass channel for adjusting a total flow area of the at least one bypass channel. During rotation of the rotating valve portion relative to the stationary valve portion, a total flow area of a passage defined by the first flow channel(s), the second flow channel(s), and the at least one bypass channel varies according to a uniform closure pattern to provide uniform pressure pulses within a single revolution of the rotating valve portion. A method of generating uniform pressure pulses in downhole drilling operations is also disclosed.

18 Claims, 6 Drawing Sheets

(51) Int. Cl.
   *E21B 10/61*       (2006.01)
   *F16K 31/04*       (2006.01)

(56) References Cited

U.S. PATENT DOCUMENTS

| | | | |
|---|---|---|---|
| 9,494,035 B2 * | 11/2016 | Logan | E21B 47/18 |
| 9,540,877 B2 * | 1/2017 | Lanning | F04C 14/26 |
| 10,633,925 B2 * | 4/2020 | Panda | F16K 11/074 |
| 10,648,265 B2 * | 5/2020 | Kinsella | E21B 17/10 |
| 10,677,006 B2 * | 6/2020 | von Gynz-Rekowski | E21B 21/10 |
| 2002/0117306 A1 | 8/2002 | Hahn et al. | |
| 2006/0272821 A1 | 12/2006 | Webb et al. | |
| 2014/0190749 A1 | 7/2014 | Lorenson et al. | |
| 2015/0233237 A1 | 8/2015 | Logan et al. | |
| 2019/0024459 A1 | 1/2019 | Sicilian et al. | |
| 2019/0249494 A1 * | 8/2019 | Winslow | E21B 7/068 |
| 2020/0056451 A1 * | 2/2020 | Chambers | E21B 47/18 |
| 2020/0325731 A1 * | 10/2020 | Chambers | E21B 7/068 |

* cited by examiner

METHOD AND APPARATUS FOR GENERATING FLUID PRESSURE PULSES OF ADJUSTABLE AMPLITUDE

CROSS-REFERENCE TO RELATED APPLICATION

This application claims priority to U.S. Provisional Application No. 62/834,648 filed on Apr. 16, 2019, the disclosure of which is hereby incorporated by reference in its entirety.

BACKGROUND OF THE DISCLOSURE

Field of the Disclosure

The present disclosure relates generally to a method and apparatus for generating fluid pressure pulses of adjustable amplitude, and more particularly, to a method and apparatus for generating fluid pressure pulses of adjustable amplitude for use in sub-surface operations, such as downhole drilling and completions.

Description of Related Art

Downhole vibration tools, sometimes referred to as agitator/agitation tools, are utilized in directional drilling and through-tubing operations to overcome downhole friction forces and enable faster drilling rates. These vibration tools are connected in-line with the drilling pipe string or coiled tubing and are configured to impart periodic pressure waves to the drilling fluid upstream of the tool to provide a percussive or hammer effect. Drilling fluid, also referred to as "mud", is pumped from the surface through the drill string. The downhole vibration tool is configured to vary the pressure of the flowing drilling fluid upstream of the tool. In this manner, the vibration tool exerts an axial force on the drill string that can create dynamic motion.

Some downhole vibration tools utilize rotating valves to create the periodic pressure pulses. Rotating valve vibration tools have a power section, such as a progressive cavity (Moineau) pump, that converts the hydraulic power of the flowing drilling fluid into rotational motion. The rotation of the pump's rotor shaft spins a valve that varies a total flow area of an obstruction in the fluid's flow path, thereby creating the periodic pressure pulses. The amplitude of the pressure pulsations is governed by the fluid flow rate, fluid density, fluid viscosity, and the difference between the flow areas when the rotating valve is in its most and least obstructed positions. The frequency of the pressure pulse is governed by the rotating valve's geometry.

With reference to FIG. 1, components of a prior art valve 100 are shown in accordance with one example. The valve 100 has a rotating valve member 102 that is connected to a rotor of the power section and is configured to rotate about its longitudinal axis 104. The rotating valve member 102 has a plurality of first openings 106 defining a pattern on the face of the rotating valve member 102. The rotating valve 100 further has a stationary valve member 108 that is connected to the drill string and is configured to be stationary relative to the rotating valve member 102. The stationary valve member 108 has a plurality of second openings 110 defining a non-symmetric pattern on the face of the stationary valve member 108. As the rotating valve member 102 rotates about the longitudinal axis 104, the total flow area defined when the plurality of first and seconds openings 106, 110 are aligned varies periodically with each rotation, thereby changing the back pressure required to maintain a nearly constant rate of the drilling fluid flowing through the valve 100.

A graph showing the flow velocity of a valve 100 in accordance with a prior art example is shown in FIG. 2A. For a rotation speed of 70 rpm (1.17 Hz), flow velocity through the valve 100 is shown as a function of angular position of the rotating valve member 102 relative to the stationary valve member 108. The signal contains four peaks of non-uniform amplitude, with the highest amplitude occurring at the second peak. FIG. 2B shows a frequency spectrum of the signal of FIG. 2A computed using a Fourier transform. This spectrum shows energy at 1.17 Hz and its higher harmonics, with maximum energy content at 4.67 Hz.

The pulse amplitude and frequency spectrum are both critical to successful operation of vibration tools. The amplitude of the pressure pulsation directly influences the ability of the tool to break downhole friction during drilling operations. However, pressure pulses must not be so severe as to induce premature equipment failure. The frequency of pressure pulses must also be tuned so as not to interfere with acoustic signals generated by downhole telemetry tools and other measuring devices. Downhole telemetry tools can create pressure pulses between 1 Hz and 10 Hz and have a maximum possible signal amplitude. For example, the valve shown in FIG. 2B has a fixed amplitude that generates a fundamental frequency and harmonics which fit within the range that can interfere with the downhole telemetry readings. Therefore, it would be desirable to provide a method and apparatus for generating fluid pulses that allow for an adjustment of the pulse amplitude and frequency spectrum.

SUMMARY OF THE DISCLOSURE

In accordance with some examples or aspects of the present disclosure, provided is a method and apparatus for generating fluid pulses that allow for an adjustment of the pulse amplitude and frequency spectrum. The method and apparatus may be configured to generate fluid pressure pulses having a fundamental frequency that is above or below the measurement frequency band of downhole telemetry tools to avoid signal contamination.

In accordance with some examples or aspects of the present disclosure, a pressure generating device for use in downhole drilling operations may have a rotating valve portion having a first body with a first proximal end and a first distal end spaced apart from the first proximal end along a first longitudinal axis. The rotating valve portion may have at least one first flow channel extending through at least a portion of the first body, the at least one first flow channel being open at a distal surface of the first distal end. The pressure generating device may further have a stationary valve portion having a second body with a second proximal end and a second distal end spaced apart from the second proximal end along a second longitudinal axis. The stationary valve portion may have at least one second flow channel extending through the second body between the second proximal end and the second distal end. The stationary valve portion may further have at least one bypass channel extending through the second body between the second proximal end and the second distal end. A flow restrictor may be positioned within the at least one bypass channel for adjusting a total flow area of the at least one bypass channel. The distal surface of the rotating valve portion may be positioned opposite a proximal surface of the second proximal end of the stationary valve portion such that, during rotation of the rotating valve portion about the first longitudinal axis relative to the stationary valve portion, a total flow area of a passage defined by the at least one first flow channel, the at least one second flow channel, and the at least one bypass channel varies according to a uniform closure pattern to provide uniform pressure pulses within a single revolution of the rotating valve portion. A fundamental frequency of the uniform pressure pulses may be higher than a rotating speed of the rotating valve portion.

In accordance with some examples or aspects of the present disclosure, the first body may have a tubular portion having an end surface and a plurality of fins protruding distally from the end surface and terminating at the distal surface. Each of the plurality of fins may have at least one first flow channel extending therethrough. A fluid crossover space between the plurality of fins may be in continuous fluid communication with the at least one bypass channel over an entire revolution of the rotating valve portion about the first longitudinal axis. An outer surface of each of the plurality of fins may be flush with an outer surface of the tubular portion. The plurality of fins may be spaced apart from each other at equal angular intervals about the first longitudinal axis. The plurality of fins has equal radial spacing from the first longitudinal axis. The plurality of fins may be oriented parallel to each another such that an axis of each of the plurality of fins is parallel with the first longitudinal axis.

In accordance with some examples or aspects of the present disclosure, the at least one bypass channel may be offset relative to the end surface of the tubular body portion of the rotating valve portion. The flow restrictor may control an amplitude of pressure pulses generated by the pressure generating device. The flow restrictor may be a nozzle that is removably mounted within the bypass channel.

In accordance with some examples or aspects of the present disclosure, a number, a size, and a spacing of the first flow channels may correspond to a number, a size, and a spacing of the second flow channels. The plurality of first flow channels may be spaced apart from each other at equal angular intervals about the first longitudinal axis. The plurality of first flow channels may have equal radial spacing from the first longitudinal axis. The plurality of second fluid channels may be spaced apart from each other at equal angular intervals about the second longitudinal axis. The plurality of second flow channels may have equal radial spacing from the second longitudinal axis. The first longitudinal axis of the rotating valve portion may be coaxial with the second longitudinal axis of the stationary valve portion. The first longitudinal axis of the rotating valve portion may be eccentric relative to the second longitudinal axis of the stationary valve portion.

In accordance with some examples or aspects of the present disclosure, a power section having a shaft may be connected to the first body of the rotating valve portion to rotate the rotating valve portion. A rotating speed of the power section may be directly proportional to a flow rate of a drilling fluid through the power section. The power section may have a fluid actuated positive displacement motor. The fluid actuated positive displacement motor may be a progressive cavity pump.

In accordance with some examples or aspects of the present disclosure, a method of generating uniform pressure pulses in downhole drilling operations may include providing a rotating valve portion having at least one first flow channel, and providing a stationary valve portion having at least one bypass channel, at least one second flow channel, and a flow restrictor within the at least one bypass channel for adjusting a total flow area of the at least one bypass channels. The method may further include positioning the rotating valve portion relative to the stationary valve portion such that the at least one first flow channel is in periodic fluid communication with the at least one second channel, and such that a space around the at least one first flow channel is in constant fluid communication with the at least one bypass channel. The method may further include rotating the rotating valve portion relative to the stationary valve portion while flowing drilling fluid through the rotating valve portion and the stationary valve portion. A total flow area of a passage defined by the at least one first flow channel, the at least one second flow channel, and the at least one bypass channel may vary according to a uniform closure pattern to provide uniform pressure pulses within a single revolution of the rotating valve portion. A fundamental frequency of the uniform pressure pulses may be higher than a rotating speed of the rotating valve portion.

In accordance with some examples or aspects of the present disclosure, the rotating valve portion may have a tubular portion having an end surface and a plurality of fins protruding distally from the end surface and terminating at a distal surface. Each of the plurality of fins may have at least one of the plurality of first flow channels extending therethrough. A fluid crossover space between the plurality of fins may be in continuous fluid communication with the at least one bypass channel over an entire revolution of the rotating valve portion about a longitudinal axis. A number, a size, and a spacing of the first flow channels may correspond to a number, a size, and a spacing of the second flow channels. The at least one bypass channel may have a flow restrictor for adjusting a total flow area of the at least one bypass channel to thereby control an amplitude of pressure pulses generated by the pressure generating device. The flow restrictor may be a nozzle.

In accordance with some examples or aspects of the present disclosure, the method and apparatus for generating fluid pulses that allow for an adjustment of the pulse amplitude and frequency spectrum can be further characterized by one or more of the following numbered clauses.

Clause 1. A pressure generating device for use in downhole drilling operations, the pressure generating device comprising: a rotating valve portion having a first body with a first proximal end and a first distal end spaced apart from the first proximal end along a first longitudinal axis, the rotating valve portion comprising: at least one first flow channel extending through at least a portion of the first body, the at least one first flow channel being open at a distal surface of the first distal end; and a stationary valve portion having a second body with a second proximal end and a second distal end spaced apart from the second proximal end along a second longitudinal axis, the stationary valve portion comprising: at least one second flow channel extending through the second body between the second proximal end and the second distal end; at least one bypass channel extending through the second body between the second proximal end and the second distal end; and a flow restrictor within the at least one bypass channel for adjusting a total flow area of the at least one bypass channel, wherein the distal surface of the rotating valve portion is positioned opposite a proximal surface of the second proximal end of the stationary valve portion such that, during rotation of the rotating valve portion about the first longitudinal axis relative to the stationary valve portion, a total flow area of a passage defined by the at least one first flow channels, the at least one second flow channel, and the at least one bypass channel varies according to a uniform closure pattern to provide uniform pressure pulses within a single revolution of the rotating valve portion.

Clause 2. The pressure generating device according to clause 1, wherein a fundamental frequency of the uniform pressure pulses is higher than a rotating speed of the rotating valve portion.

Clause 3. The pressure generating device according to clause 1 or 2, wherein the first body comprises a tubular portion having an end surface and a plurality of fins protruding distally from the end surface and terminating at the distal surface, and wherein each of the plurality of fins has at least one first flow channel extending therethrough.

Clause 4. The pressure generating device according to any of clauses 1-3, wherein a fluid crossover space between the plurality of fins is in continuous fluid communication with the at least one bypass channel over an entire revolution of the rotating valve portion about the first longitudinal axis.

Clause 5. The pressure generating device according to any of clauses 1-4, wherein an outer surface of each of the plurality of fins is flush with an outer surface of the tubular portion.

Clause 6. The pressure generating device according to any of clauses 1-5, wherein the plurality of fins are spaced apart from each other at equal angular intervals about the first longitudinal axis.

Clause 7. The pressure generating device according to any of clauses 1-6, wherein the plurality of fins have equal radial spacing from the first longitudinal axis.

Clause 8. The pressure generating device according to any of clauses 1-7, wherein the plurality of fins are oriented parallel to each another such that an axis of each of the plurality of fins is parallel with the first longitudinal axis.

Clause 9. The pressure generating device according to any of clauses 1-8, wherein a number, a size, and a spacing of the at least one first flow channel corresponds to a number, a size, and a spacing of the at least one second flow channel.

Clause 10. The pressure generating device according to any of clauses 1-9, wherein the at least one bypass channel is offset relative to the end surface of the tubular body portion of the rotating valve portion.

Clause 11. The pressure generating device according to any of clauses 1-10, wherein the flow restrictor controls an amplitude of pressure pulses generated by the pressure generating device.

Clause 12. The pressure generating device according to any of clauses 1-11, wherein the flow restrictor is a nozzle.

Clause 13. The pressure generating device according to any of clauses 1-12, wherein the flow restrictor is removably mounted within the bypass channel.

Clause 14. The pressure generating device according to any of clauses 1-13, wherein the at least one first flow channel is a plurality of first flow channels symmetrically spaced apart from each other at equal angular intervals about the first longitudinal axis.

Clause 15. The pressure generating device according to any of clauses 1-14, wherein the at least one first flow channel is a plurality of first flow channels having equal radial spacing from the first longitudinal axis.

Clause 16. The pressure generating device according to any of clauses 1-15, wherein the at least one second flow channel is a plurality of second flow channels symmetrically spaced apart from each other at equal angular intervals about the second longitudinal axis.

Clause 17. The pressure generating device according to any of clauses 1-16, wherein the at least one second flow channel is a plurality of second flow channels having equal radial spacing from the second longitudinal axis.

Clause 18. The pressure generating device according to any of clauses 1-17, wherein the first longitudinal axis of the rotating valve portion is coaxial with the second longitudinal axis of the stationary valve portion.

Clause 19. The pressure generating device according to any of clauses 1-18, wherein the first longitudinal axis of the rotating valve portion is eccentric relative to the second longitudinal axis of the stationary valve portion.

Clause 20. The pressure generating device according to any of clauses 1-19, further comprising a power section having a shaft connected to the first body of the rotating valve portion to rotate the rotating valve portion.

Clause 21. The pressure generating device according to any of clauses 1-20, wherein a rotating speed of the power section is directly proportional to a flow rate of a drilling fluid through the power section.

Clause 22. The pressure generating device according to any of clauses 1-21, wherein the power section comprises a fluid actuated positive displacement motor.

Clause 23. The pressure generating device according to any of clauses 1-22, wherein the fluid actuated positive displacement motor is a progressive cavity pump.

Clause 24. A method of generating uniform pressure pulses in downhole drilling operations, the method comprising: providing a rotating valve portion having at least one first flow channel; providing a stationary valve portion having at least one second flow channel, at least one bypass channel, and a flow restrictor within the at least one bypass channel for adjusting a total flow area of the at least one bypass channel; positioning the rotating valve portion relative to the stationary valve portion such that the at least one first flow channel is in periodic fluid communication with the at least one second flow channel, and such that a space around the at least one first flow channel is in constant fluid communication with the at least one bypass channel; and rotating the rotating valve portion relative to the stationary valve portion while flowing drilling fluid through the rotating valve portion and the stationary valve portion, wherein a total flow area of a passage defined by the at least one first flow channel, the at least one second flow channel, and the at least one bypass channel varies according to a uniform closure pattern to provide uniform pressure pulses within a single revolution of the rotating valve portion.

Clause 25. The method according to clause 24, wherein a fundamental frequency of the uniform pressure pulses is higher than a rotating speed of the rotating valve portion.

Clause 26. The method according to clause 24 or 25, wherein the rotating valve portion comprises a tubular portion having an end surface and a plurality of fins protruding distally from the end surface and terminating at a distal surface, and wherein each of the plurality of fins has at least one first flow channel extending therethrough.

Clause 27. The method according to any of clauses 24-26, wherein a fluid crossover space between the plurality of fins is in continuous fluid communication with the at least one bypass channel over an entire revolution of the rotating valve portion about a longitudinal axis.

Clause 28. The method according to any of clauses 24-27, wherein a number, a size, and a spacing of the at least one first flow channel corresponds to a number, a size, and a spacing of the at least one second flow channel.

Clause 29. The method according to any of clauses 24-28, wherein the flow restrictor controls an amplitude of pressure pulses generated by the pressure generating device.

Clause 30. The method according to any of clauses 24-29, wherein the flow restrictor is a nozzle.

The features that characterize the present disclosure are pointed out with particularity in the claims, which are annexed to and form a part of this disclosure. These and other features of the disclosure, its operating advantages, and the specific objects obtained by its use will be more fully understood from the following detailed description in which non-limiting examples of the disclosure are illustrated and described.

BRIEF DESCRIPTION OF THE DRAWINGS

In FIGS. 1-8, like characters refer to the same components and elements, as the case may be, unless otherwise stated.

DETAILED DESCRIPTION OF THE DISCLOSURE

Figure 1:
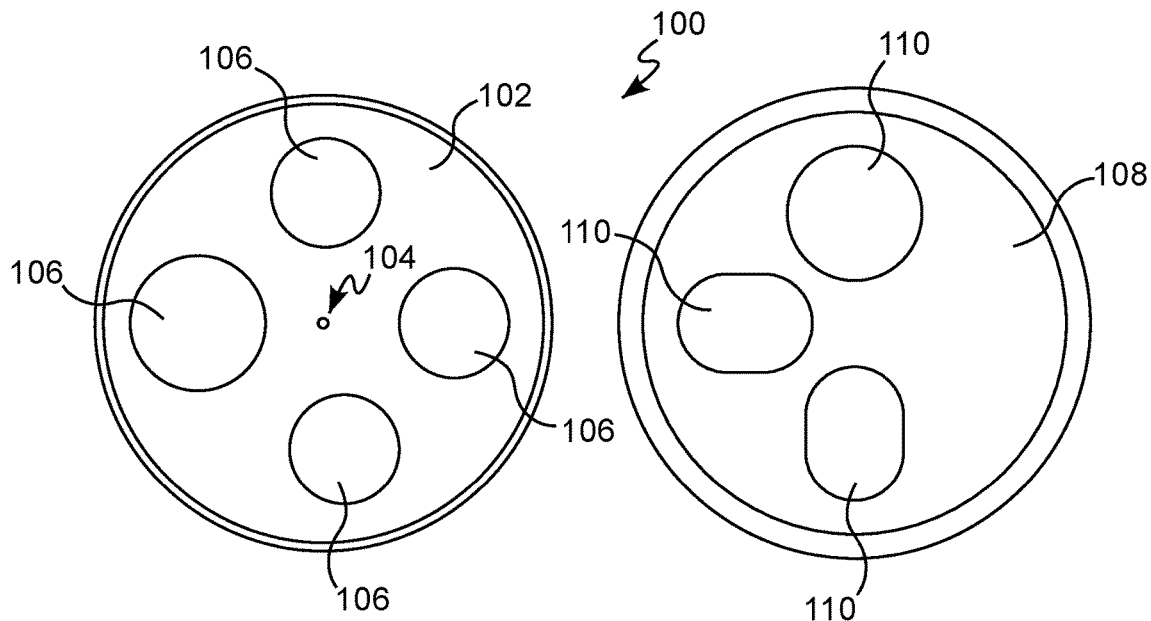
FIG. 1 is a cross-sectional view of components of a rotating valve in accordance with a prior art example.
Figure 2A:
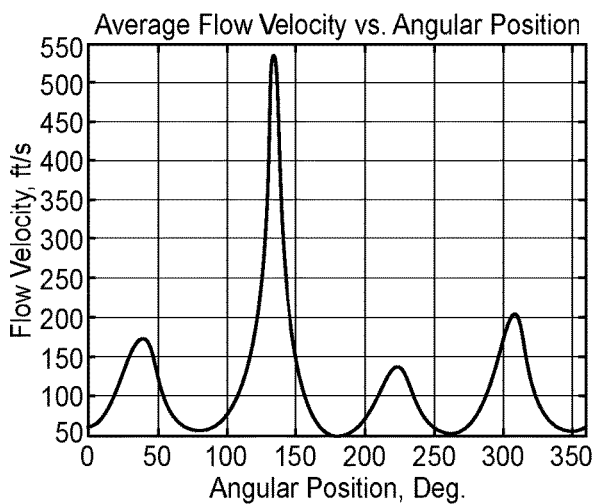
FIG. 2A is a graph showing flow velocity of fluid flowing through the plurality of openings of the prior art valve shown in FIG. 1 as a function of angular position of a rotating valve member relative to a stationary valve member.
Figure 2B:
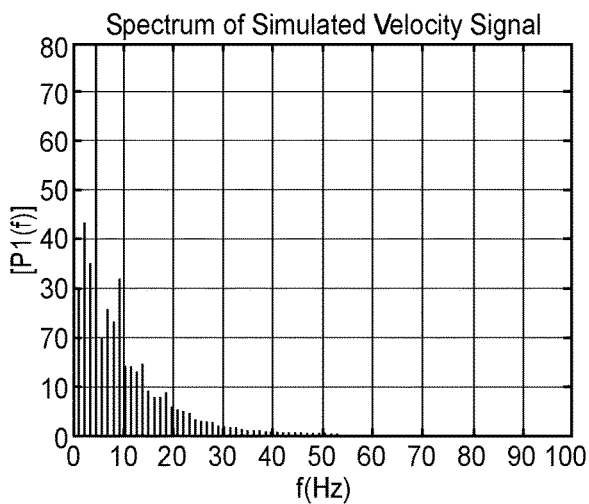
FIG. 2B is a frequency spectrum of the valve shown in FIG. 1 operating at a predefined rotating speed.

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

As used herein, "at least one of" is synonymous with "one or more of". For example, the phrase "at least one of A, B, or C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

As used herein, the term "proximal" refers to a portion of a downhole assembly that is closest to a ground surface and furthest away from a cutting face of a drill bit, while the term "distal" refers to a portion of a downhole assembly that is furthest away from the ground surface and closest to a cutting face of a drill bit.

The disclosure comprises, consists of, or consists essentially of, the following examples or aspects, in any combination. Various examples or aspects of the disclosure are illustrated in separate drawing figures. However, it is to be understood that this is simply for ease of illustration and discussion. In the practice of the disclosure, one or more examples or aspects shown in one drawing figure can be combined with one or more examples or aspects shown in one or more of the other drawing figures.

Figure 3:
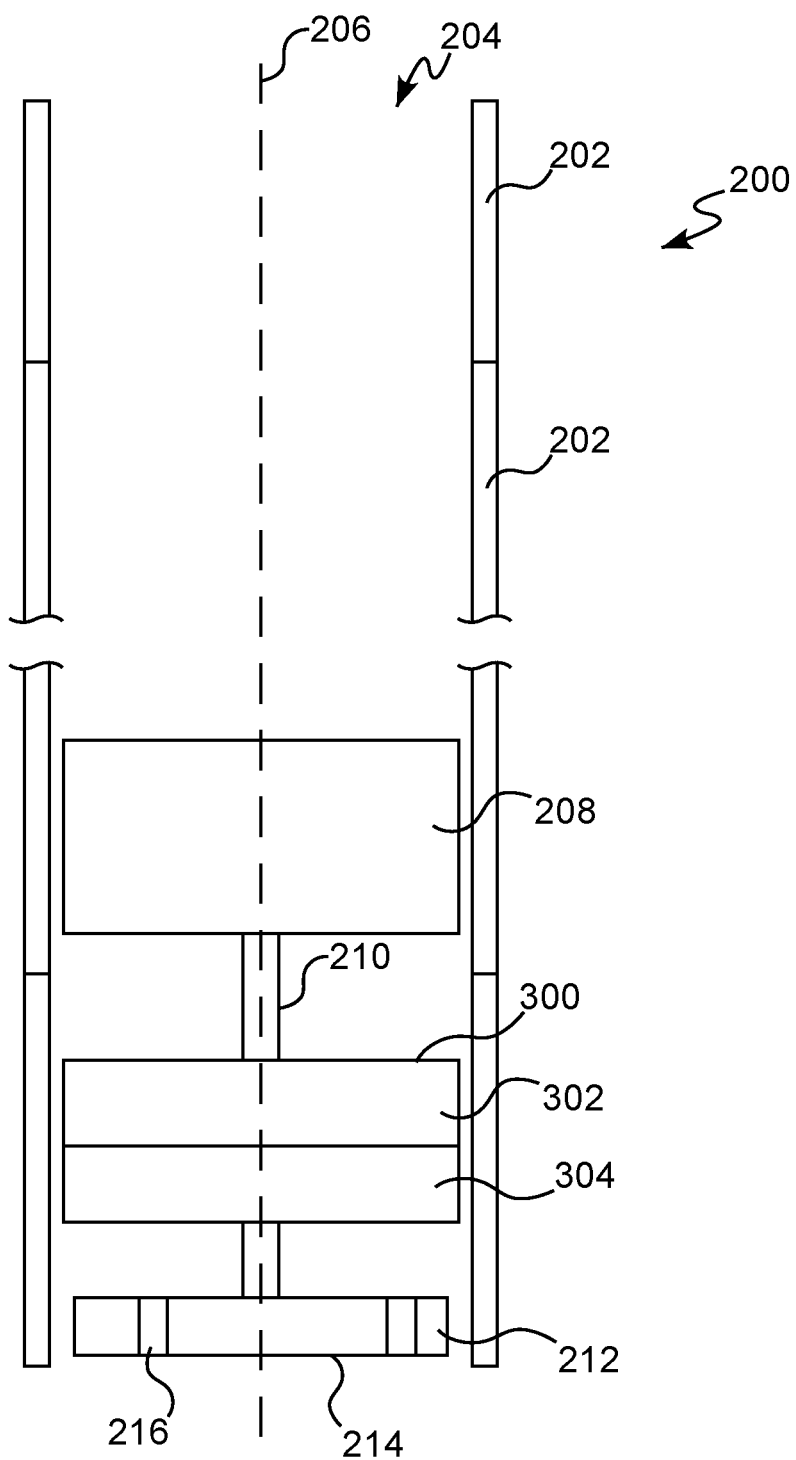
FIG. 3 is a schematic view of a lower end of a downhole assembly having a flow pulsing apparatus in accordance with some non-limiting examples or aspects of the present disclosure.

With reference to FIG. 3, a downhole assembly 200 having a pressure generating device 300 is shown in accordance with some examples or aspects of the present disclosure. The downhole assembly 200 may be configured for drilling of deep wells, such as oil and gas wells. In some examples or aspects, the downhole assembly 200 includes a plurality of hollow tubular pipes 202 connected together to define a central fluid channel 204 therethrough. The downhole assembly 200 is rotated from the surface about its longitudinal axis 206 using drilling fluid that is pumped through the central fluid channel 204. The drilling fluid passes through a power section 208, such as a progressive cavity (Moineau) pump, that converts the hydraulic power of the flowing drilling fluid into rotational motion. In other examples or aspects, the downhole assembly 200 may include coiled tubing having a power section 208 that is powered by the drilling fluid pumped from the surface.

A rotating speed of the power section 208 is directly proportional to the rate of flow of fluid through the power section 208. A shaft 210 of the power section 208 is connected to the pressure generating device 300 to rotate a rotating valve portion 302 relative to a stationary valve portion 304 of the pressure generating device 300. Such rotation of the rotating valve portion 302 of the pressure generating device 300 varies a total flow area of an obstruction in the flow path of the drilling fluid through the pressure generating device 300, thereby creating periodic pressure pulses. Downstream of the pressure generating device 300 is a drill bit 212 having a cutting face 214 configured for contacting the ground surface. Drilling fluid exits the drill bit 212 through one or more nozzles 216. The periodic pressure waves created by the pressure generating device 300 exert axial forces on the tubing assembly that create axial movement and reduce frictional resistance.

Figure 4A:
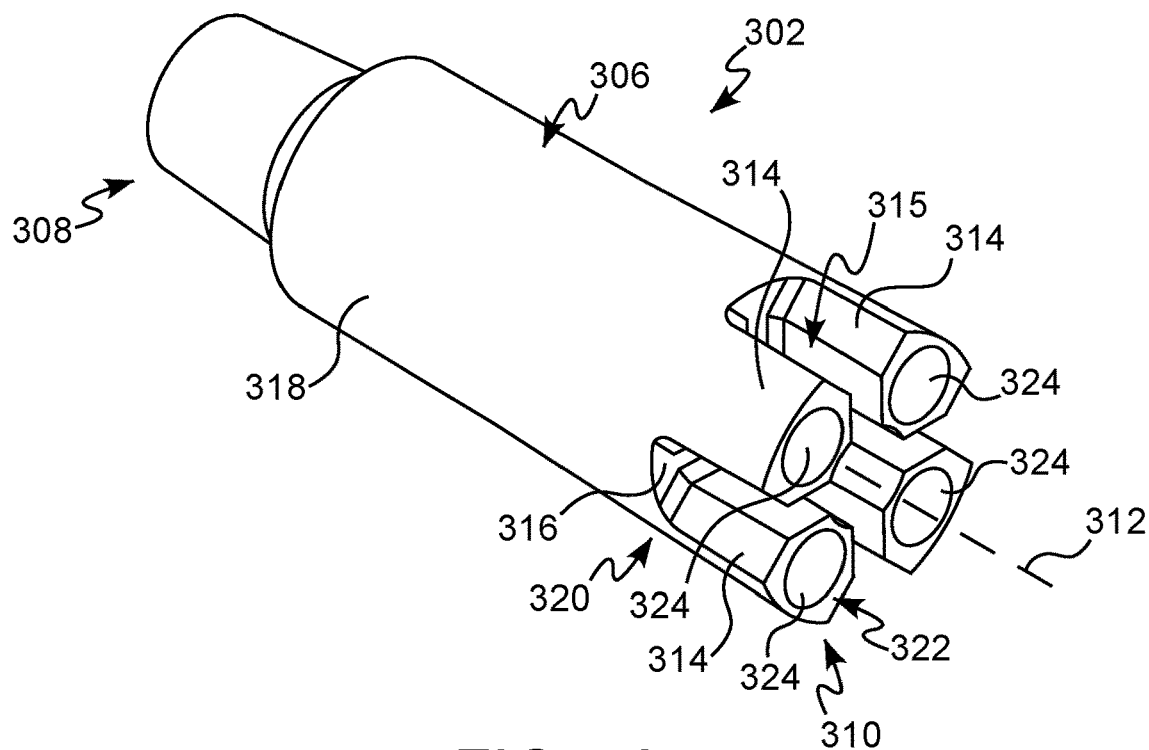
FIG. 4A is a bottom perspective view of a rotating valve member of the flow pulsing apparatus in accordance with some examples or aspects of the present disclosure.
Figure 4B:
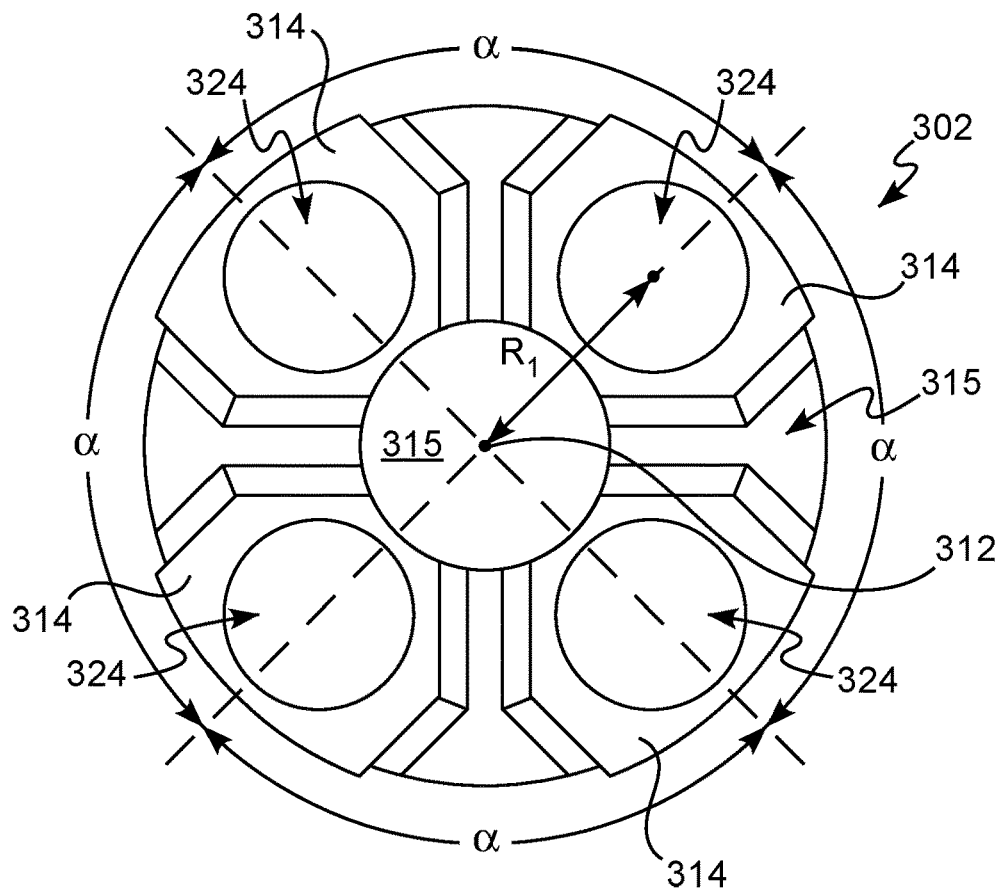
FIG. 4B is a bottom view of the rotating valve member shown in FIG. 4A.

With reference to FIGS. 4A-4B, the rotating valve portion 302 of the pressure generating device 300 (shown in FIG. 3) is shown in detail in accordance with some examples or aspects of the present disclosure. The rotating valve portion 302 has a first body 306 with a proximal end 308 configured for connecting to the shaft 210 of the power section 208 (shown in FIG. 3). The body 306 of the rotating valve portion 302 further has a distal end 310 spaced apart from the proximal end 308 in a direction along a longitudinal axis 312. In some examples or aspects, the longitudinal axis 312 of the rotating valve portion 302 may be substantially coaxial with the longitudinal axis 206 of the downhole assembly 200 (shown in FIG. 3). The rotating valve portion 302 is configured to rotate about its longitudinal axis 312 due to movement of the shaft 210 of the power section 208 connected to the proximal end 308 of the body 306.

With continued reference to FIGS. 4A-4B, the distal end 310 has a plurality of fins 314 protruding distally from an end surface 316 of a tubular portion 318 of the body 306. Each fin 314 has a proximal fin end 320 connected to the end surface 316 of the tubular portion 318 of the body 306 and a distal fin end 322 protruding from the proximal fin end 320. The fins 314 may have an outer radial surface that is substantially flush with an outer surface of the tubular portion 318 of the body 306. The fins 314 may be spaced apart from each other and oriented substantially parallel to one another such that an axis of each fin 314 may be substantially parallel with the longitudinal axis 312 of the body 306.

With reference to FIG. 4B, the plurality of fins 314 are spaced apart from each other in equal angular intervals α about the longitudinal axis 312. For example, FIGS. 4A-4B show an example of the rotating valve portion 302 having four fins 314 that are spaced 90 degrees from each other. The rotating valve portion 302 may have more or less fins 314 than the number illustrated in FIGS. 4A-4B. For example, the rotating valve portion 302 may have two fins 314 spaced apart at 180 degrees from each other, or three fins 314 spaced apart at 120 degrees from each other, or any other number of fins 314. In some examples or aspects, the plurality of fins 314 may further have equal radial spacing R1 from the longitudinal axis 312, as measured from a center of the fin 314 to the longitudinal axis 312. An area between the fins 314 defines a fluid crossover 315 where drilling fluid may accumulate for flow through a bypass channel on the stationary valve portion 304, as described herein. In some examples or aspects, the rotating valve portion 302 may not have any fins 314. In such examples, the end surface 316 of the tubular portion 318 of the body 306 defines the distal end 310 of the rotating valve portion 302.

With continued reference to FIGS. 4A-4B, each fin 314 has at least one first flow channel 324. In some examples or aspects, such as examples or aspects where the rotating valve portion 302 does not have fins 314, the at least one first flow channel 324 may be formed directly on the end surface 316 of the tubular portion 318 of the body 306. In some examples, the at least one first flow channel 324 may extend through the body 306 of the rotating valve portion 302 in a direction along the longitudinal axis 312. In some examples or aspects, a flow area of the one or more first flow channels 324 on each fin 314 may be the same. In this manner, the rotating valve portion 302 has a symmetric shape with equal number of fins 314, angular and radial spacing of the fins 314, and the number and flow area of the first flow channels 324. In some examples or aspects, each first flow channel 324 may have a circular cross section. In other examples or aspects, at least some of the first flow channels 324 may have a non-circular cross-section.

Figure 5A:
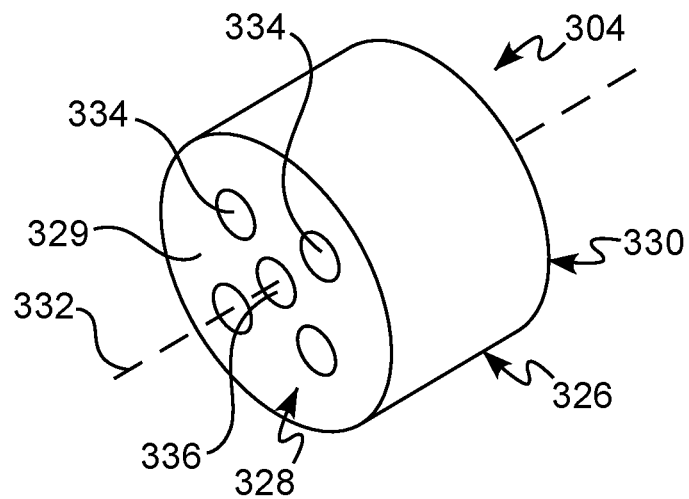
FIG. 5A is a top perspective view of a stationary valve member of the flow pulsing apparatus in accordance with some examples or aspects of the present disclosure.
Figure 5B:
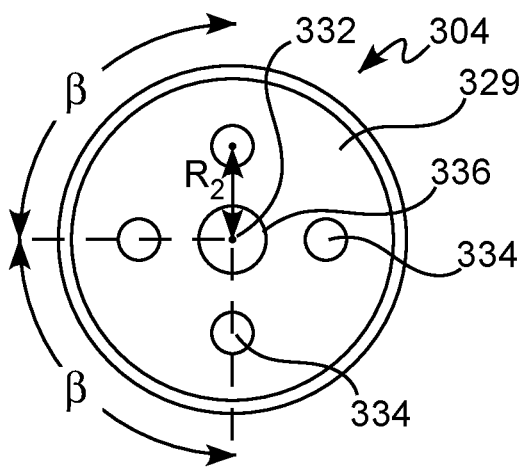
FIG. 5B is a top view of the stationary valve member shown in FIG. 5A.
Figure 5C:
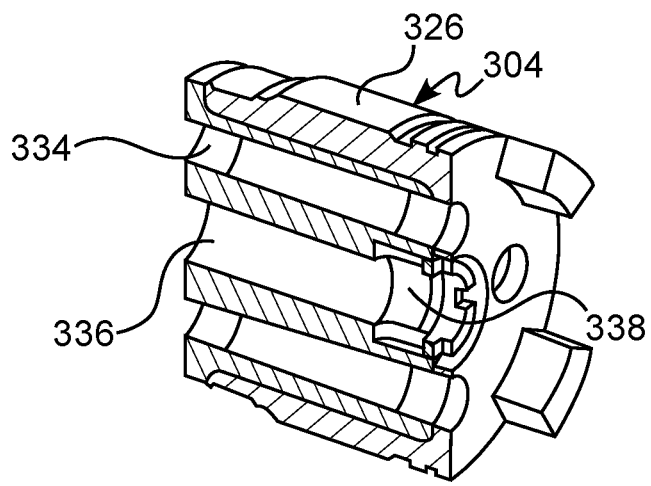
FIG. 5C is a side cross-sectional view of a stationary valve member in accordance with some examples or aspects of the present disclosure.

With reference to FIGS. 5A-5C, the stationary valve portion 304 of the pressure generating device 300 (shown in FIG. 3) is shown in detail. The stationary valve portion 304 has a second body 326 with a proximal end 328 and a distal end 330 spaced apart from the proximal end 328 in a direction along a longitudinal axis 332. The proximal end 328 has a proximal surface 329 that is positioned opposite to the distal surface 322 of the rotating valve portion 302. In some examples or aspects, the longitudinal axis 332 of the stationary valve portion 304 may be substantially coaxial with the longitudinal axis 206 of the downhole assembly 200 (shown in FIG. 3) and the longitudinal axis 312 of the rotating valve portion 302 (shown in FIG. 4A). In other examples or aspects, the longitudinal axis 332 of the stationary valve portion 304 may be eccentric with the longitudinal axis 206 of the downhole assembly 200 and/or the longitudinal axis 312 of the rotating valve portion 302. The stationary valve portion 304 is configured to be stationary, such as due to its connection with the sidewall of the downhole assembly 200.

With continued reference to FIGS. 5A-5C, the stationary valve portion 304 has a plurality of second flow channels 334 extending through the body 326 between the proximal end 328 and the distal end 330. Each of the plurality of second flow channels 334 is configured to flow drilling fluid that is received from the first flow channels 324 on the rotating valve portion 302.

The plurality of second flow channels 334 are spaced apart from each other in equal angular intervals β about the longitudinal axis 332. For example, FIG. 5B shows an example of the stationary valve portion 304 having four second flow channels 334 that are spaced 90 degrees from each other. The stationary valve portion 304 may have more or less second flow channels 334 than the number illustrated in FIGS. 5A-5C. For example, the stationary valve portion 304 may have two second flow channels 334 spaced apart at 180 degrees from each other, or three second flow channels 334 spaced apart at 120 degrees from each other, or any other number of second flow channels 334.

In some examples or aspects, the plurality of second flow channels 334 may further have equal radial spacing R2 from the longitudinal axis 332. Each second flow channel 334 may have a circular cross section. In other examples or aspects, at least some of the second flow channels 334 may have a non-circular cross-section. A flow area of the one or more second flow channels 334 may be the same. In this manner, the stationary valve portion 304 has a symmetric shape with equal number of second flow channels 334, angular and radial spacing of the second flow channels 334, and the flow area of the second flow channels 334. At least one of the number, angular and/or radial spacing, and the flow area of the second flow channels 334 may be selected to correspond to at least one of the number, angular and/or radial spacing, and the flow area of the first flow channels 324 on the rotating valve portion 302.

With continued reference to FIGS. 5A-5C, the stationary valve portion 304 further has at least one bypass channel 336. While FIGS. 5A-5C show the at least one bypass channel 336 as a single opening positioned substantially in the center of the stationary valve portion 304, the at least one bypass channel 336 may have a plurality of bypass channels provided on any portion of the stationary valve portion 304. The at least one bypass channel 336 is configured to flow drilling fluid from the fluid crossover 315 of the rotating valve portion 302 between the fins 314 (shown in FIG. 4A) such that there is continuous, non-zero fluid flow between the rotating valve portion 302 and the stationary valve portion 304.

With particular reference to FIG. 5C, the at least one bypass channel 336 may have a flow restrictor 338. In some examples or aspects, the flow restrictor 338 may be a nozzle configured for varying a total flow area of the at least one bypass channel 336. The flow restrictor 338 may be removably connected to the stationary valve portion 304. In this manner, flow restrictors 338 of various sizes can be used to change the total cross-sectional area of the at least one bypass channel 336, thereby altering or adjusting the performance characteristics of the pressure generating device 300, as described herein. In various examples or aspects, the flow restrictor 338 can be installed/removed during assembly or maintenance of the pressure generating device 300.

Figure 6A:
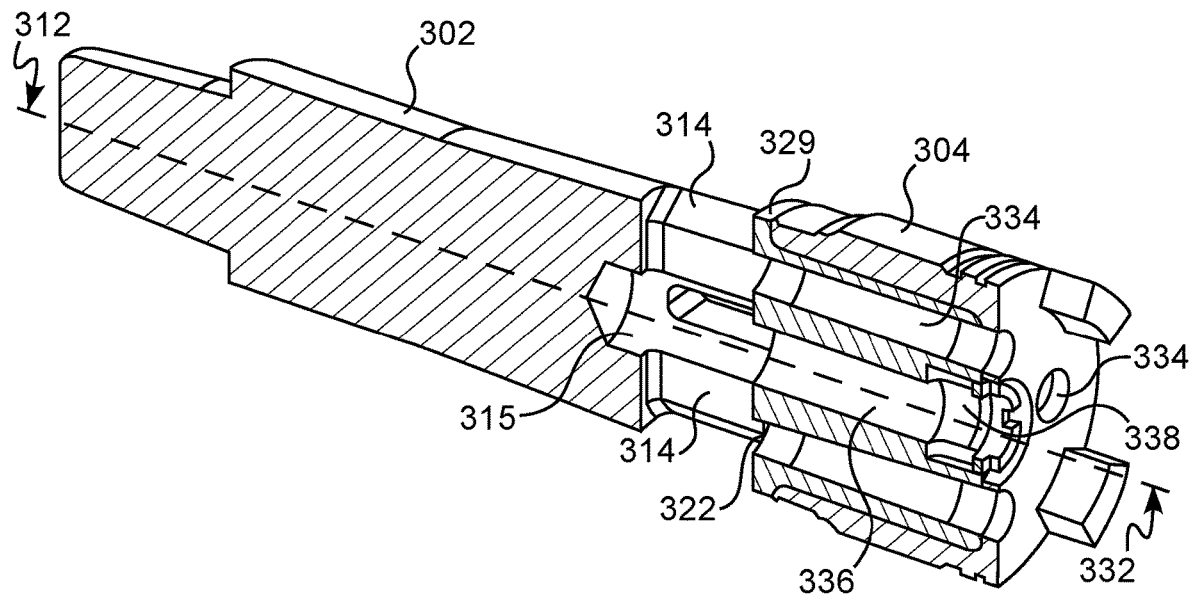
FIG. 6A is a side cross-sectional view of the flow pulsing apparatus showing the rotating valve member in a first position relative to the stationary valve member.
Figure 6B:
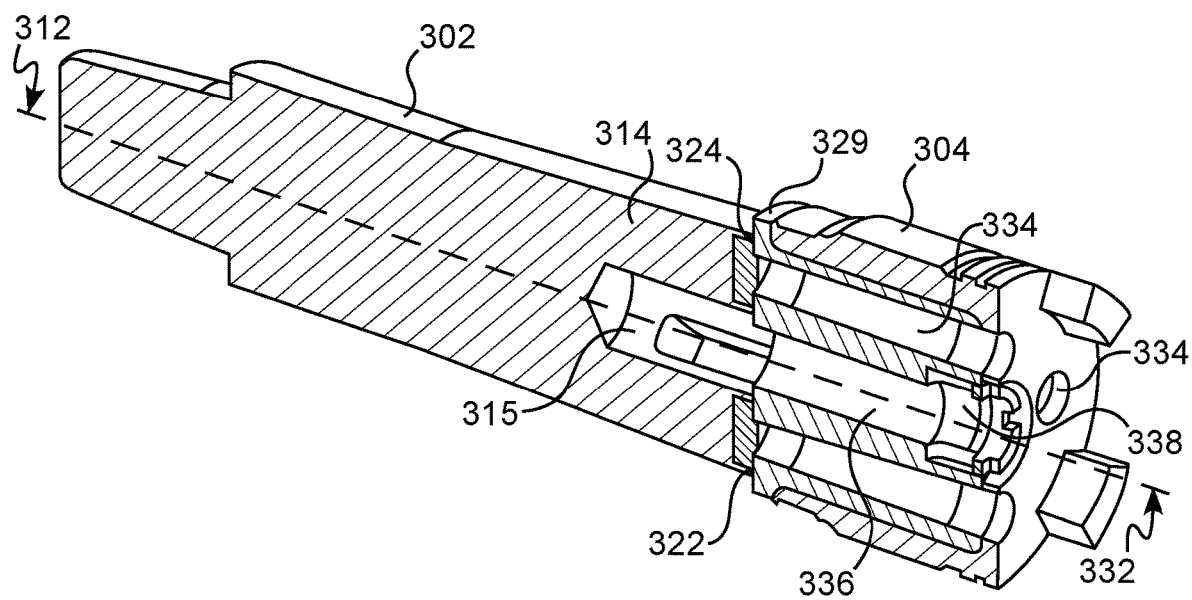
FIG. 6B is a side cross-sectional view of the flow pulsing apparatus showing the rotating valve member in a second position relative to the stationary valve member.

With reference to FIGS. 6A-6B, the distal surface 322 of the rotating valve portion 302 is positioned opposite the proximal surface 329 of the stationary valve portion 304. As the rotating valve portion 302 rotates about its longitudinal axis 312, the plurality of first flow channels 324 come in and out of alignment with the plurality of second flow channels 334 on the stationary valve portion 304. In a first orientation (FIG. 6A), the first flow channels 324 may be out of alignment with the second flow channels 334 such that the pressure generating device 300 has total flow area. Additionally, any drilling fluid in the fluid crossover 315 between the fins 314 of the rotating valve portion 302 flows into the at least one bypass channel 336.

In a first orientation (FIG. 6A), the first flow channels 324 may be out of alignment with the second flow channels 334 such that the pressure generating device 300 has total flow area. Additionally, any drilling fluid in the fluid crossover 315 between the fins 314 of the rotating valve portion 302 flows into the at least one bypass channel 336. For example, the proximal surface 329 of the stationary valve portion 304 may completely block the fluid flow from the first flow channels 324 to the second flow channels 334. In this orientation, some drilling fluid may leak from the first flow channels 324 into the fluid crossover 315 between the fins 314. This fluid, along with any other fluid that may flow into the fluid crossover 315 may then flow through the at least one bypass 336 such that the pressure generating device 300 has a positive, non-zero flow. Such positive, non-zero flow prevents the stalling of the power section 210. In the first orientation, the pressure generating device 300 has a minimum total flow area. Desirably, the at least one bypass channel 336 is not obstructed by any portion of the rotating valve portion 302. In some examples or aspects, the at least one bypass channel 336 may be partially obstructed by at least a portion of the rotating valve portion 302, such as at least a portion of at least one fin 314.

In a second orientation, such as shown in FIG. 6B, the rotating valve portion 302 is rotated about its longitudinal axis 312 such that the first flow channels 324 are aligned with the second flow channels 334. Additionally, any drilling fluid in the fluid crossover 315 between the fins 314 of the rotating valve portion 302 flows into the at least one bypass channel 336. In the second orientation, the pressure generating device 300 has a maximum total flow area.

In a third orientation, the rotating valve portion 302 is rotated about its longitudinal axis 312 such that the first flow channels 324 are partially aligned with the second flow channels 334 such that the total flow area through the first and second flow channels 324, 334 is smaller than the maximum total flow area but larger than the minimum total flow area. For example, the proximal surface 329 of the stationary valve portion 304 may partially block the fluid flow from the first flow channels 324 to the second flow channels 334. In the third orientation, the pressure generating device 300 has an intermediate total flow area between the minimum total flow area and a maximum total flow area.

Figure 7:
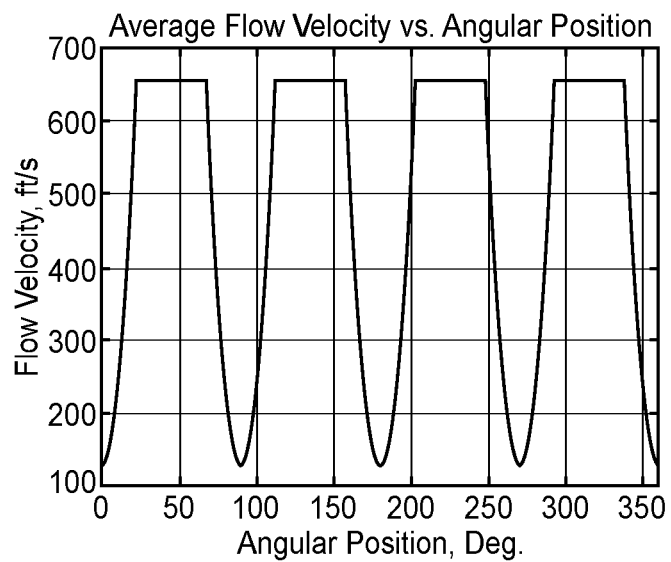
FIG. 7 is a graph showing flow velocity of fluid flowing through the flow pulsing apparatus in accordance with some examples or aspects as a function of angular position of a rotating valve member relative to a stationary valve member.
Figure 8:
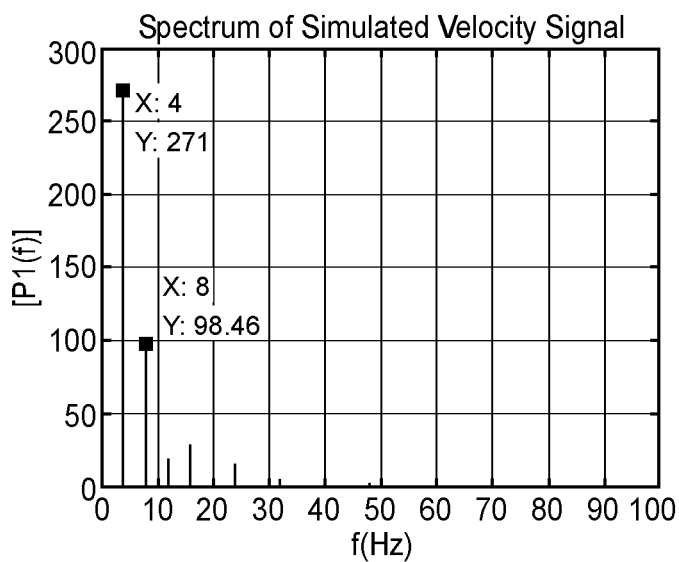
FIG. 8 is a frequency spectrum of the flow pulsing apparatus having the flow characteristics shown in FIG. 7 and operating at a predefined rotating speed.

With reference to FIG. 7, the symmetric spacing of the first and second flow channels 324, 334 is configured to create a uniform closure pattern having uniform pressure pulses as the rotating valve portion 302 rotates relative to the stationary valve portion 304. Amplitude of such pressure pulses can be controlled by selecting the size of the flow restrictor 338 in the at least one bypass channel 336. In this manner, the pressure generating device 300 can be used to create varying pressure pulse amplitudes at different flow rates. With reference to FIG. 8, a uniform closure pattern creates pressure pulses with fundamental frequencies at or above the rotating speed of the rotating valve portion 302. For a rotating valve portion 302 that rotates at 60 RPM (1 Hz), the fundamental frequency occurs at 4 Hz. The frequency of the pressure pulses can be selected so as not to interfere with acoustic signals generated by downhole telemetry tools, which may have higher or lower signals than that of the fundamental frequency of the pressure generating device 300.

It will be readily appreciated by those skilled in the art that various modifications, as indicated above, may be made to the disclosure without departing from the concepts disclosed in the foregoing description. Accordingly, the particular examples or aspects described in detail herein are illustrative only and are not limiting to the scope of the disclosure, which is to be given the full breadth of the appended claims and any and all equivalents thereof.

What is claimed is:

1. A pressure generating device for use in downhole drilling operations, the pressure generating device comprising:
   a rotating valve portion having a first body with a first proximal end and a first distal end spaced apart from the first proximal end along a first longitudinal axis, the rotating valve portion comprising:

at least one first flow channel extending through at least a portion of the first body, the at least one first flow channel being open at a distal surface of the first distal end; and a stationary valve portion having a second body with a second proximal end and a second distal end spaced apart from the second proximal end along a second longitudinal axis, the stationary valve portion comprising:

at least one second flow channel extending through the second body between the second proximal end and the second distal end;

at least one bypass channel extending through the second body between the second proximal end and the second distal end; and a flow restrictor within the at least one bypass channel for adjusting a total flow area of the at least one bypass channel, wherein the distal surface of the rotating valve portion is positioned opposite a proximal surface of the second proximal end of the stationary valve portion such that, during rotation of the rotating valve portion about the first longitudinal axis relative to the stationary valve portion, a total flow area of a passage defined by the at least one first flow channel, the at least one second flow channel, and the at least one bypass channel varies according to a uniform closure pattern to provide uniform pressure pulses within a single revolution of the rotating valve portion and wherein the first body comprises a tubular portion having an end surface and a plurality of fins protruding distally from the end surface and terminating at the distal surface, and wherein each of the plurality of fins has at least one first flow channel extending therethrough.

2. The pressure generating device according to claim 1, wherein a fundamental frequency of the uniform pressure pulses is higher than a rotating speed of the rotating valve portion.

3. The pressure generating device according to claim 1, wherein a fluid crossover space between the plurality of fins is in continuous fluid communication with the at least one bypass channel over an entire revolution of the rotating valve portion about the first longitudinal axis.

4. The pressure generating device according to claim 1, wherein an outer surface of each of the plurality of fins is flush with an outer surface of the tubular portion and are spaced apart from each other at equal angular intervals about the first longitudinal axis.

5. The pressure generating device according to claim 1, wherein the plurality of fins have equal radial spacing from the first longitudinal axis and are oriented parallel to each another such that an axis of each of the plurality of fins is parallel with the first longitudinal axis.

6. The pressure generating device according to claim 1, wherein the at least one bypass channel is offset relative to the end surface of the tubular body portion of the rotating valve portion.

7. The pressure generating device according to claim 1, wherein a number, a size, and a spacing of the at least one first flow channel corresponds to a number, a size, and a spacing of the at least one second flow channel.

8. The pressure generating device according to claim 1, wherein the flow restrictor controls an amplitude of pressure pulses generated by the pressure generating device.

9. The pressure generating device according to claim 1, wherein the flow restrictor is a nozzle that is removably mounted within the bypass channel.

10. The pressure generating device according to claim 1, wherein the at least one first flow channel is a plurality of first flow channels symmetrically spaced apart from each other at equal angular intervals about the first longitudinal axis and equal radial spacing from the first longitudinal axis.

11. The pressure generating device according to claim 1, wherein the at least one second flow channel is a plurality of second flow channels symmetrically spaced apart from each other at equal angular intervals about the second longitudinal axis and equal radial spacing from the second longitudinal axis.

12. The pressure generating device according to claim 1, wherein the first longitudinal axis of the rotating valve portion is coaxial or eccentric with the second longitudinal axis of the stationary valve portion.

13. The pressure generating device according to claim 1, further comprising a power section having a shaft connected to the first body of the rotating valve portion to rotate the rotating valve portion.

14. The pressure generating device according to claim 13, wherein the power section comprises a fluid actuated positive displacement motor.

15. A method of generating uniform pressure pulses in downhole drilling operations, the method comprising:

providing a rotating valve portion having at least one first flow channel;

providing a stationary valve portion having at least one second flow channel, at least one bypass channel, and a flow restrictor within the at least one bypass channel for adjusting a total flow area of the at least one bypass channel;

positioning the rotating valve portion relative to the stationary valve portion such that the at least one first flow channel is in periodic fluid communication with the at least one second channel, and such that a space around the at least one first flow channel is in constant fluid communication with the at least one bypass channel; and rotating the rotating valve portion relative to the stationary valve portion while flowing drilling fluid through the rotating valve portion and the stationary valve portion, wherein a total flow area of a passage defined by the at least one first flow channel, the at least one second flow channel, and the at least one bypass channel varies according to a uniform closure pattern to provide uniform pressure pulses within a single revolution of the rotating valve portion, wherein the rotating valve portion comprises a tubular portion having an end surface and a plurality of fins protruding distally from the end surface and terminating at a distal surface, and wherein each of the plurality of fins has at least one first flow channel extending therethrough.

16. The method according to claim 15, wherein a fundamental frequency of the uniform pressure pulses is higher than a rotating speed of the rotating valve portion.

17. The method according to claim 15, wherein a fluid crossover space between the plurality of fins is in continuous fluid communication with the at least one bypass channel over an entire revolution of the rotating valve portion about a longitudinal axis.

18. The method according to claim 15, wherein the flow restrictor is a nozzle.

\* \* \* \* \*

UNITED STATES PATENT AND TRADEMARK OFFICE
CERTIFICATE OF CORRECTION

PATENT NO. : 11,105,167 B2
APPLICATION NO. : 16/660349
DATED : August 31, 2021
INVENTOR(S) : Collins et al.

Page 1 of 1

It is certified that error appears in the above-identified patent and that said Letters Patent is hereby corrected as shown below:

In the Claims

Column 13, Line 30, Claim 1, after "portion" insert -- , --

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*